M. LAEMMEL.
Improvement in Machine for Cutting Confectionery Paste, Soap, etc.

No. 123,265.   Patented Jan. 30, 1872.

UNITED STATES PATENT OFFICE.

MORITZ LAEMMEL, OF BAY RIDGE, NEW YORK.

IMPROVEMENT IN MACHINES FOR CUTTING CONFECTIONERY-PASTE, SOAP, AND OTHER PLASTIC COMPOSITIONS.

Specification forming part of Letters Patent No. 123,265, dated January 30, 1872.

*To all whom it may concern:*

Be it known that I, MORITZ LAEMMEL, of Bay Ridge, in the county of Kings and State of New York, have invented a new and Improved Machine for Cutting Plastic Compounds; and I do hereby declare the following to be a full, clear, and exact description thereof, which will enable those skilled in the art to make and use the same, reference being had to the accompanying drawing forming part of this specification, in which drawing—

Figure 1:
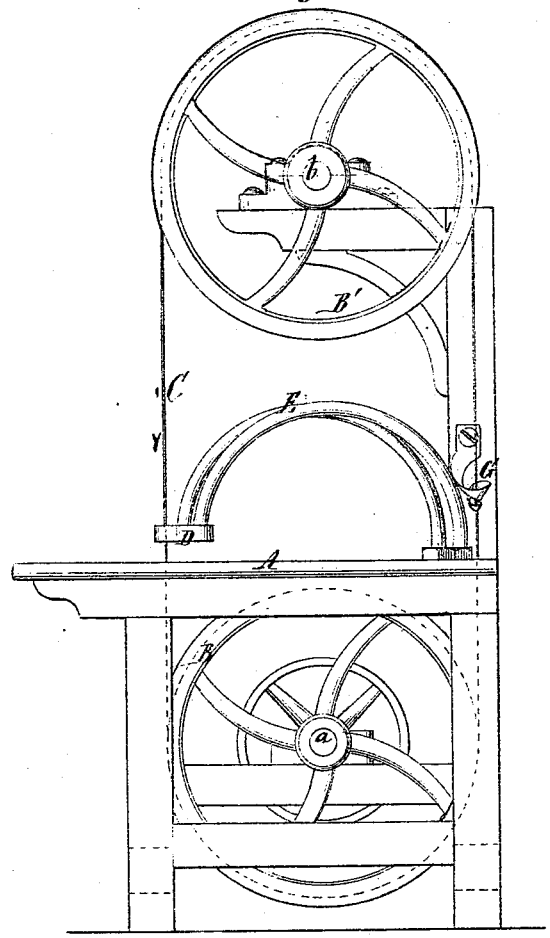
Figure 2:
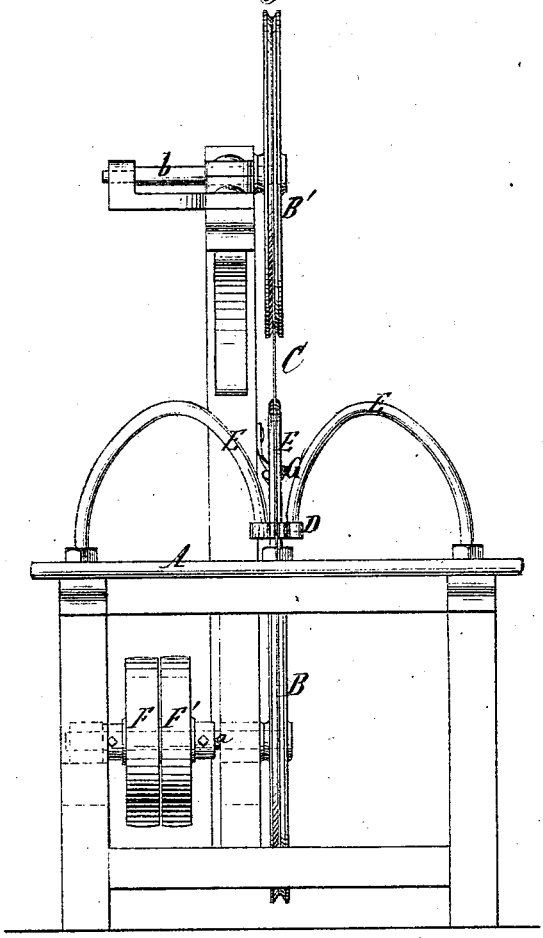

Figure 1 represents a side view of this invention. Fig. 2 is a front view of the same.

Similar letters indicate corresponding parts.

This invention relates to a machine for cutting plastic compounds, such, for instance, as printing-blocks used for colored printing, or soap, or other material of a similar nature, said machine being composed, principally, of an endless strand of wire or other suitable material stretched over two pulleys, between which is situated a table or platform in such a manner that when the pulleys are set in motion the operation of cutting the plastic compound can be effected with ease and facility by feeding the same over the table or platform toward the endless strand. With this endless strand is combined conchoidal scraper for the purpose of keeping the same clean, said scraper being so formed that the particles removed by its action from the strand are prevented from being thrown on the table or on the material placed thereon.

In the drawing, the letter A designates a table or platform, which is situated between two pulleys, B B', the pulley B being mounted on a shaft, *a*, which has its bearings in the frame supporting the table A, while the pulley B' is mounted on a shaft, *b*, which has its bearings in a standard rising from the table A. Round the pulleys B B' is stretched a thin metal wire, C; or, if desired, a strong cord may be used, the table A being provided with suitable apertures, through which said endless strand C passes. On the table is secured a guide, D, which straddles the endless strand and serves to keep the same in line. Said guide is raised above the table to leave room for the material to be cut, and it is fastened to suitable curved arms E, as shown, or it may be secured in any desirable manner. On the shaft *a* of the lower pulley B are mounted a fast and loose pulley, F F', over which runs the driving-belt; or, if desired, motion may be imparted to the pulleys B B', by means of a treadle or by any other suitable power or mechanism. The pulleys B B' are turned so that the endless strand C moves in the direction of the arrow, marked near it in Fig. 1, and by placing a slab of the compound to be cut on the table and feeding it against the endless strand said slab can be cut in regular or irregular pieces or shapes, as may be required. On the standard rising from the platform or table A is secured a scraper, G, which is by preference made conchoidal, as shown, and which straddles the strand. By this scraper the endless strand is cleaned from such parts of the plastic compound which may adhere thereto, and by the conchoidal shape of said scraper the particles removed from the endless strand are prevented from being thrown upon the table A or upon the compound spread thereon. If the faces of the pulleys B B' are made of sufficient width, two or more endless strands can be stretched over the same at suitable distances apart and my machine can be used with advantage for cutting soap; but I have designed it principally for cutting blocks which I prepare for producing many-colored prints, and which have to be cut in various shapes, according to the different designs to be produced.

What I claim as new, and desire to secure by Letters Patent, is—

1. A machine for cutting plastic compounds or materials, consisting of a table, A, and of one or more endless strands, C, of metal wire or other suitable material, stretched over pulleys B B', substantially in the manner set forth.

2. The conchoidal scraper G, in combination with the endless strand C and table A, substantially as shown and described.

This specification signed by me this 13th day of November, 1871.

MORITZ LAEMMEL.

Witnesses:
W. HAUFF,
E. F. KASTENHUBER.